United States Patent [19]
Ovnicek

[11] Patent Number: 5,566,765
[45] Date of Patent: Oct. 22, 1996

[54] HORSESHOE

[75] Inventor: Eugene D. Ovnicek, Columbia Fall, Mont.

[73] Assignee: World Wide Horseshoes, Inc., Whitefish, Mont.

[21] Appl. No.: 193,013

[22] PCT Filed: Mar. 22, 1993

[86] PCT No.: PCT/US93/02573

§ 371 Date: May 31, 1995

§ 102(e) Date: May 31, 1995

[87] PCT Pub. No.: WO94/21113

PCT Pub. Date: Sep. 29, 1994

[51] Int. Cl.[6] .................................................. A01L 1/04
[52] U.S. Cl. .................................................. 168/4; 168/24
[58] Field of Search .................................. 168/4, 24, 29, 168/DIG. 1

[56] References Cited

U.S. PATENT DOCUMENTS

| | | | |
|---|---|---|---|
| 265,567 | 10/1882 | Billings | 168/24 |
| 483,537 | 10/1892 | Chapman | 168/24 |
| 585,187 | 6/1897 | Davies | |
| 3,548,947 | 12/1970 | Mackay-Smith | 168/29 |
| 4,721,165 | 1/1988 | Ovnicek | 168/24 |
| 5,165,481 | 11/1992 | Duckett | 168/4 |

*Primary Examiner*—Robert P. Swiatek
*Attorney, Agent, or Firm*—Harry M. Cross, Jr.

[57] ABSTRACT

Horseshoe device having a squared off toe portion including branches with heel portions in which the front edge of the toe portion is straight or linear across its front. The edge extends under the toe of the hoof an approximate predetermined distance from the hoof toe. An insert grab plate is formed or received in a cavity on the bottom of the shoe such that the ground contact surface thereof is forward of a line extending directly downwardly from the tip of the coffin bone to a line of up to 30 degrees forward and also extending from the coffin bone tip.

11 Claims, 4 Drawing Sheets

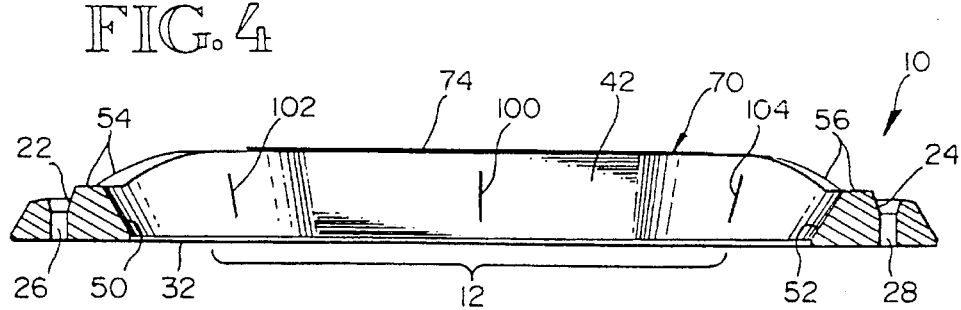
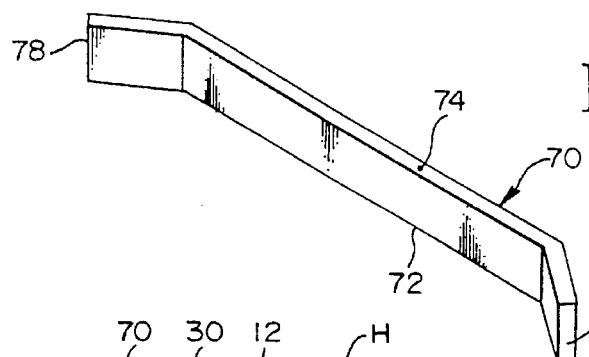
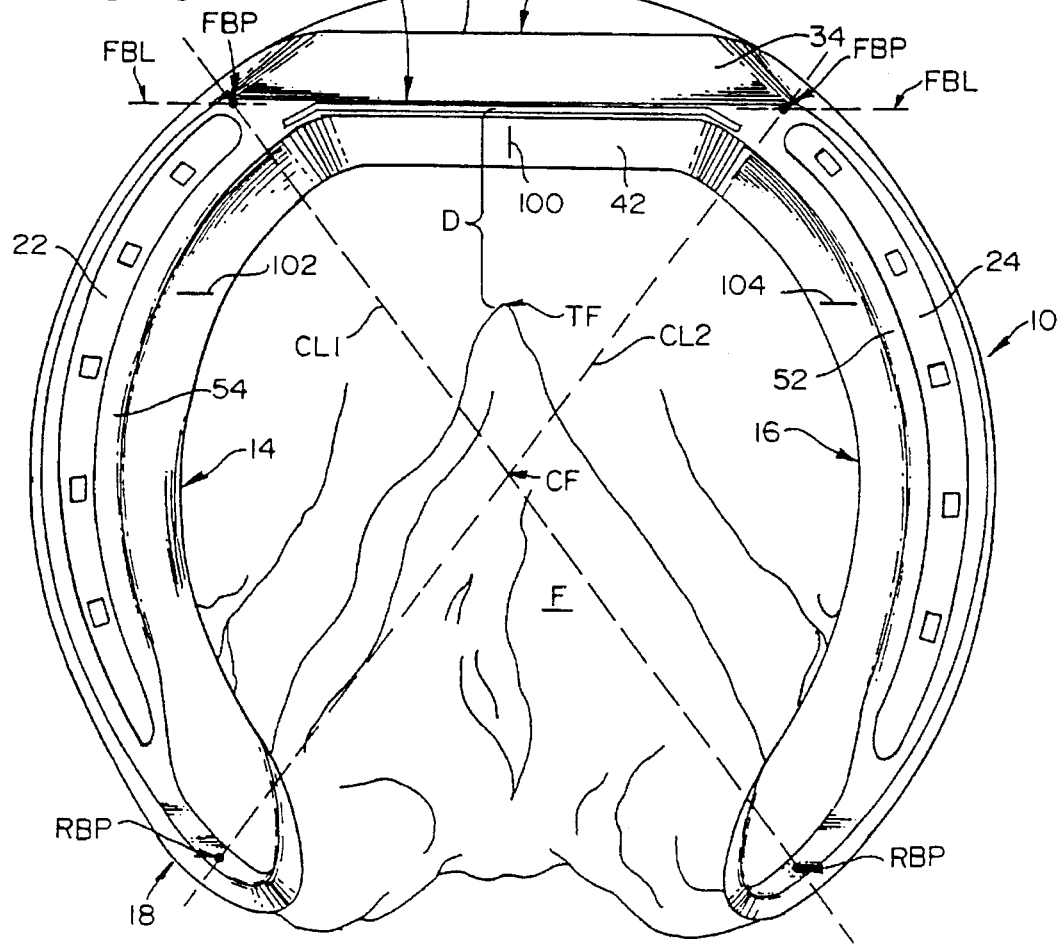

HORSESHOE

DESCRIPTION

1. Technical Field

The invention relates generally to the field of farriery and more particularly to a horseshoe design for horses hooves which enables the animal to move with a more natural motion of its feet.

2. Background Art

As those skilled in the art, particularly farriers and veterinarians, are aware domestic horses have for a great many years been routinely shod with shoes the purpose of which was to lengthen the stride of the animal to provide traction and prevent concussion. Thus, it has been commonplace to lengthen the toe in order to accomplish the longer stride, especially in race horses. As a result horses were shod with long shoes and lowered heels in the belief that this would decrease the concussion and lengthen the stride. In point of fact research departments in farrier science have found that the opposite may be true. Studies indicate that lengthening the toe and dropping the heel decrease the hoof angle, and that the old ways have been contributing factors to hoof related problems such as bowed tendons, ringbone, navicular disease, bucked shins and sesamoid problems. The longer toe and shorter heel theory has been thought to lower the arc of the foot's flight pattern. Again, however, it has been found that it takes the hoof longer to break over and delayed break over increases fatigue. It is to be kept in mind that break over is the last phase of the stride prior to the hoof's leaving the ground. The end of the toe and the foot rotate over losing traction with the ground and beginning the next stride.

For race horses the desire has been to minimize stresses on the leg structure including tendons and ligaments. Tendons become pulled if the hoof comes off the ground unnaturally so that the flexor tendons are stressed and the extensors in turn are also stressed trying to compensate for the unnatural flexor action. Another common problem is that of chipped knees caused by unnatural break over placing excessive strain on the multiple bone structure. The result can be and often is that corners of the bones are chipped off. Because it is conventional and most practical to fit a shoe to the most forward part of the hoof the art of shoeing horses has perpetuated the practice of causing unnatural foot action, and thus the excessive strain on the tendon system and secondary stress on the bone structure.

Among the prior art references are the following U.S. Pat. Nos. 90,394; 100,328; 155,362; 180,980; 421,349; 483,537; 507,276; 591,166; 562,567; 764,950; 804,839; 980,655; 998,196; 3,460,637; 3,794,120; 3,311,174; 2,791,280; 3,159,220; 4,333,532; 4,721,165. See also HORSESHOEING THEORY AND HOOF CARE, Leslie Emery, Jim Miller, Nyles Van Hoosen, 1977, Lea & Febiger, Philadelphia. The only horseshoe of those shown in the prior art and identified above is the structure disclosed in U.S. Pat. No. 4,721,165 by applicant herein. The referenced patent, however, does not teach a shoe which places the calk or grab plate forward of a line substantially directly under the tip of the coffin bone.

DISCLOSURE OF THE INVENTION

The invention is a horseshoe having a closed end or toe portion which is formed to extend transversely or laterally across the front and under the hoof rather than being rounded to the shape of the toe of the hoof. A grab plate is shaped to extend across the toe from just forward of a line extending substantially directly down from the tip of the coffin bone of the hoof to another line about thirty degrees forward measuring from the coffin bone tip. The toe is formed so that the inside edge of the toe portion angles downwardly and forwardly and the front edge of the toe angles downwardly and rearwardly so that there is no inclination for the shoe to drag or interfere through the horse's stride. The shoe is also formed so that the branches conform to a natural pattern of wear in unshod horses. The heel is slightly raised so that for racing horses the grab plate is slightly higher than or even with the heel because of the soft material of race tracks. For more conventional saddle horse usage the shoe is of about equal height both front and back. It is contemplated that the heels could be higher than the grab plate on the toe.

Accordingly it is among the features and advantages of this invention to provide a horseshoe design that conforms to the natural wear pattern of a horse's hoof. The toe is formed substantially straight across so that the grab plate is located, when the shoe is installed on a horse's foot, forwardly of the tip of the horse's coffin bone in a zone defined between a line extending substantially directly down from the tip of the coffin bone and a line extending outward from the coffin bone tip at an angle of thirty degrees with the angle being determined from the tip of the coffin bone. The design permits the horse to employ its most natural leg and hoof action, a natural and unimpeded break over so that stresses on the tendons and bone structure are minimized. Since the stresses are minimized the muscular structure becomes less easily fatigued. The shoe's design enables a limited amount of rotation when the shoe is fitted to a particular horse so that the shoe is square with or conforms with the angle in which the knee flexes. Thus, the horse does not have to favor an unbalanced hoof-knee action and lose any power in its stride. This shoe will allow the horse to move over the toe of its foot in a manner that is most natural for it.

BRIEF DESCRIPTION OF THE DRAWINGS

FIG. 4 is a cross section view taken along the line 4—4 of FIG. 2 and further illustrating details of the design;

FIG. 5 is perspective view of the insert grab plate;

FIG. 6 is a bottom plan view of the shoe of this invention as it would appear in relation to the frog when mounted to a horse's foot, the shoe embodiment having a straight toe and a straight grab plate.

BEST MODE FOR CARRYING OUT THE INVENTION

The history and development of today's horses show that in the wild where they live successfully, as for instance in the arid regions of the American west, the hoof shape and health depend on the specific environment and lifestyle therein.

Significantly, the finest quality horn composition and least amount of deformity in hooves occur in these wild animals. As the horse developed the task of flexing the leg fell primarily to the deep digital flexor tendon and at the same time the importance of the navicular bone increased since it functions as a pulley or brace for the deep digital flexor tendon. Many of the guidelines for shoeing horses have come from the form the hoof assumes when the animal runs wild.

When a naturally shaped hoof is placed on a level surface the ground surfaces of the hoof walls are well rounded, especially at the toe where the most friction occurs. The hoof wall at the toe usually appears short and the heels generally strong and wide. The front hooves exhibit this condition to a much greater degree than the hind feet. Hooves shaped under such conditions rarely have pointed toes or sharp edged walls. Thus, a degree of upward concavity is seen across the toe between the quarters and along both branches between toe and heel. Regardless of environment, whether it is wet or dry or a combination of both, the rotation point of a hoof varies from a point just forward of a line extending directly down from the tip of the coffin bone to up to thirty degrees forward thereof. The angle of thirty degrees forwardly is defined from the tip of the coffin bone.

What has been discovered is that the break over point for domestic horses undergoes a transition from a point forward of a line extending generally directly downward from the tip of the coffin bone.

Figure 1:
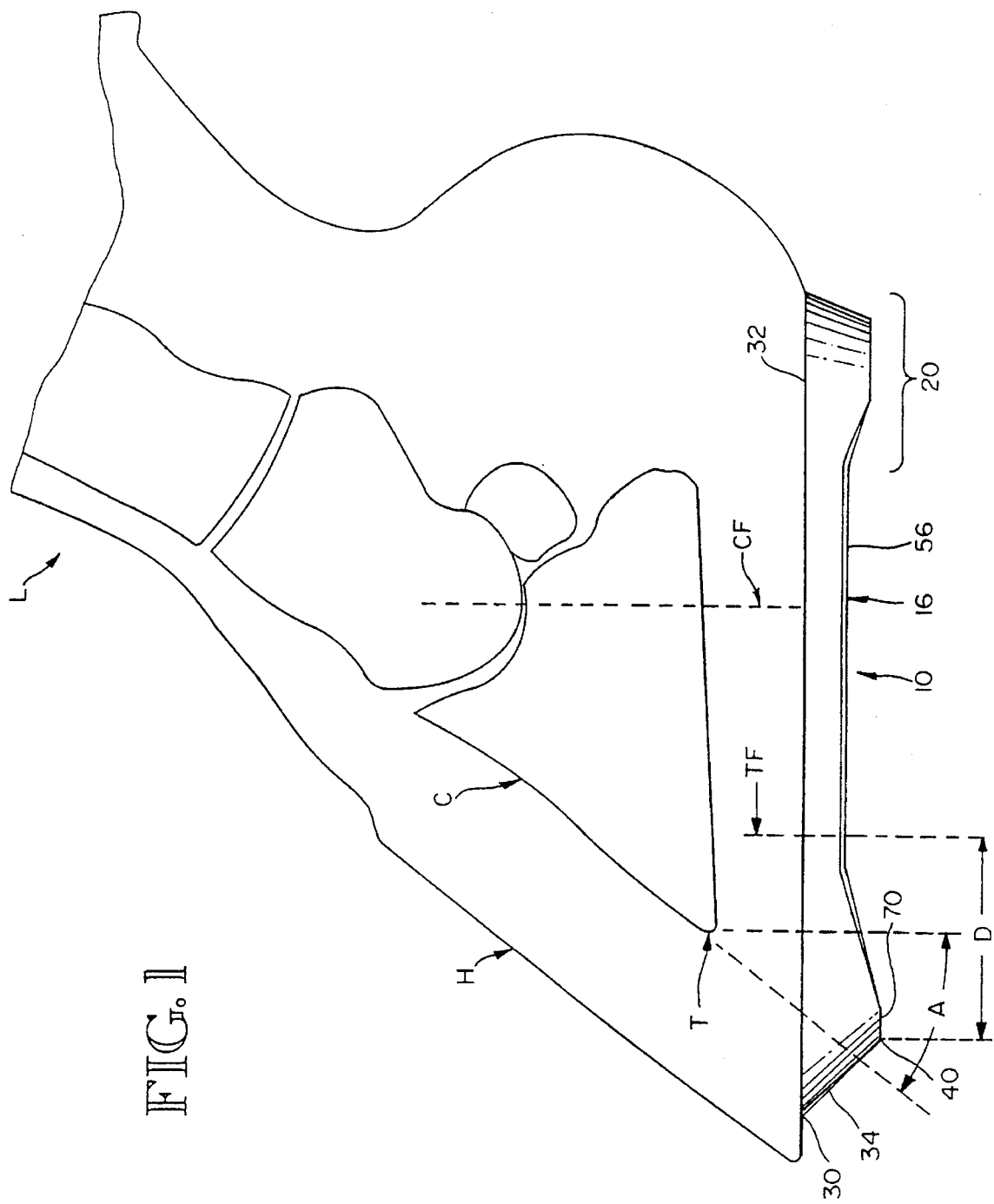
FIG. 1 is an illustrative view of the outline structure of a horse's lower leg and hoof showing the location of the coffin bone with the hoof and the position of the shoe of this invention with respect to the coffin bone.
Figure 2:
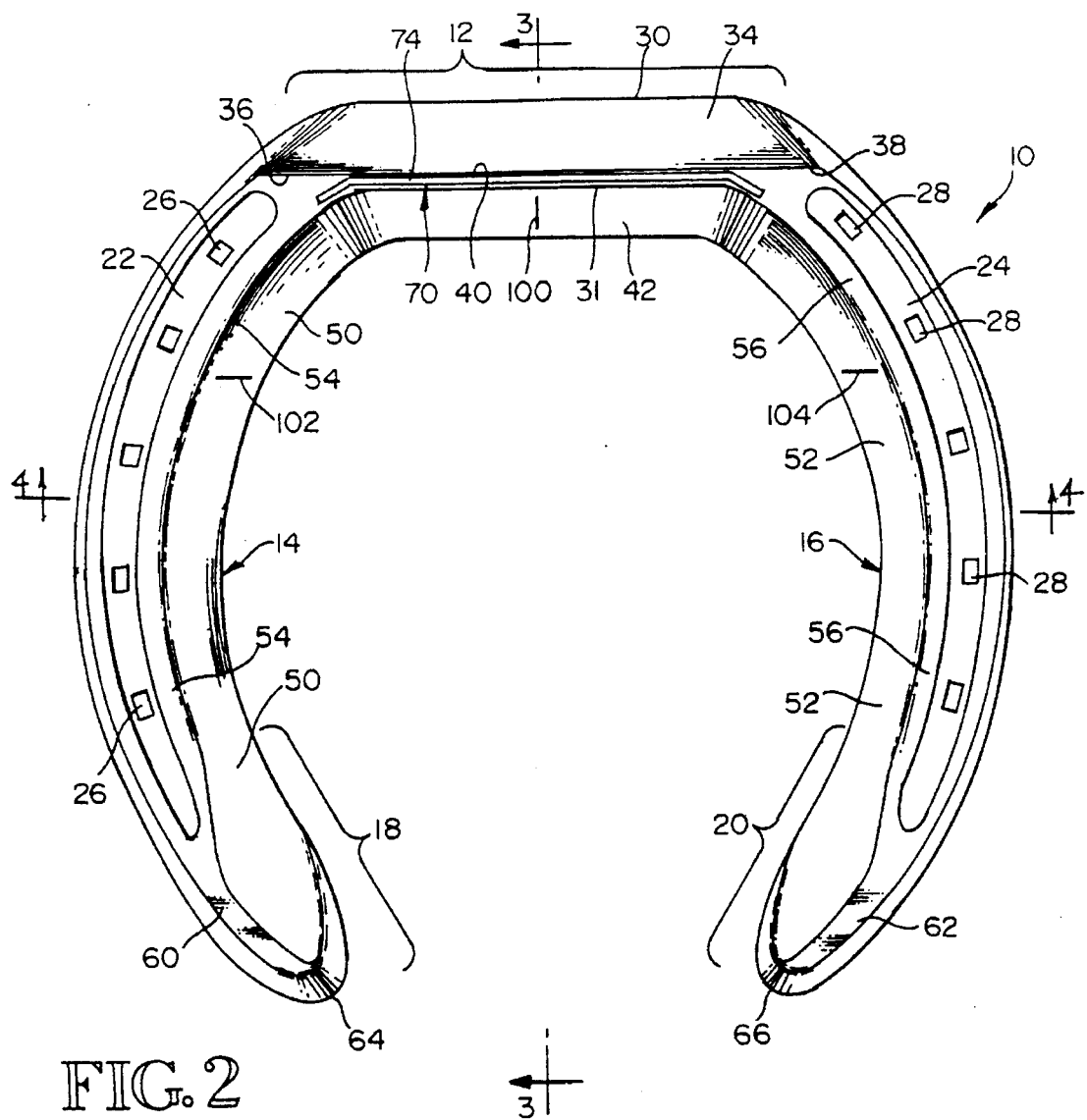
FIG. 2 is a bottom plan view of the shoe of this invention showing details of its configuration and construction.

Referring now to the drawings it will be seen that FIGS. 1 and 6 show the lower portion of a horse's leg in general outline to illustrate the principle of the instant invention. Within leg L and hoof H is the coffin bone C at the bottom of a column of leg bones to which the hoof is attached. For optimum action the hoof must break over as near the center of the toe as possible. To enable such break over the coffin bone C is round or arcuate in shape to provide support on the sides. The wider form of a front hoof provides a greater area of support for the heavier weight borne by the front leg and also tends to prevent break over to the side. The rear hooves on the other hand have straighter sides and allow lateral break over. The tip T of the coffin bone is, as stated above, generally arcuate across the front. The sole of a horse's foot contains the frog F which serves to cushion the foot during impact.

Figure 7:
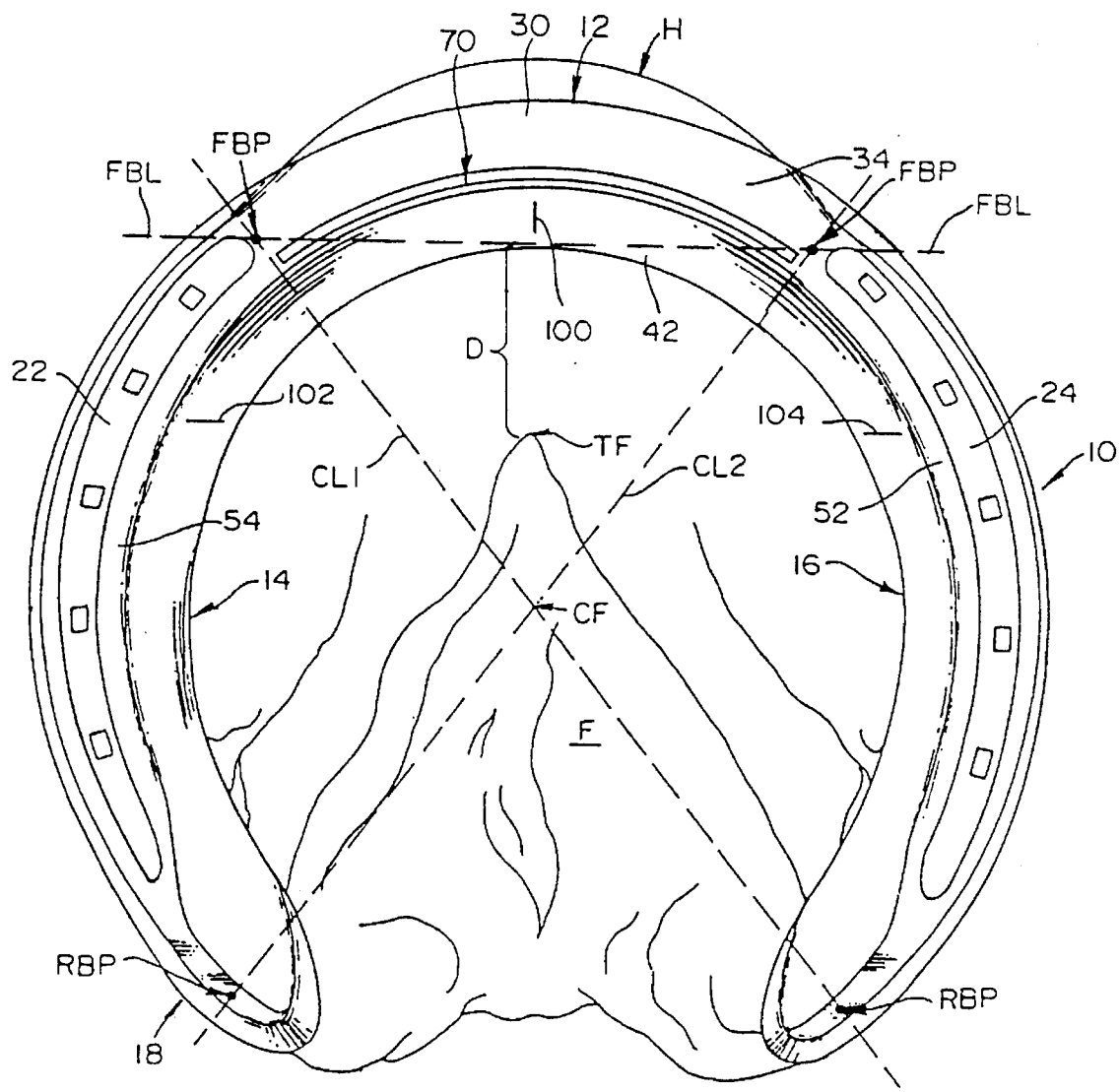
FIG. 7 is a bottom plan view of the shoe of this invention as it would appear in relation to the frog when mounted to a horse's foot, the shoe embodiment having a flattened, but still curved, toe and a slightly curved grab plate.

FIGS. 1, 6 and 7 illustrate the placement of the shoe with respect to the center of the foot CF and the foot front and rear bearing points. The shoe branches are widest across from the center of the foot CF and the cross-over lines CL1 and CL2 that extend between the diagonally-opposite front and rear bearing points, designated FBP and RBP respectively, show the placement of the grab plate 70 relative to the front bearing line FBL that extends transversely between the front bearing points FBP, FBP. For a straight-toed shoe with a straight grab plate as shown in FIG. 6, the grab plate lies on the front bearing line FBL and extends from one bearing point FBP to the other bearing point FBP. For a flattened, but rounded, toed shoe with a slightly curved grab plate as shown in FIG. 7, the grab plate extends from one bearing point FBP to the other bearing point FBP, and the curvature of the grab plate lies slightly forward of the front bearing line FBL. In the FIG. 7 shoe, the toe of the shoe, although slightly curved, is flattened sufficiently that the toe is broad enough so that the front bearing points FBP, FBP are located where the curvature of the toe transitions in the curvature of the shoe branches. Also, with respect to the FIG. 7 shoe, the front bearing points FBP, FBP and the corners (or ends) of the grab plate 70 must be lowered slightly with respect to the rest of the grab plate to the extent that the front bearing points FBP, FBP are extended at least 1/16 inch below the center of the grab plate, and may be extended up to ¼ inch beyond the grab plate center.

The four bearing points FBP, FBP, RBP and RBP, at the medial and lateral toe and at the medial and lateral heel, are located by the crossed lines CL1 and CL2 that extend through the center of the foot CL and intersect the foot edges at the natural bearing points of the foot. The front bearing points at the toe indicate where breakover should occur. The crossed lines CL1 and CL2 extend diagonally between medial heel and lateral toe and between lateral heel and medial toe; the cross over point CF lying between about ⅜–¾ inch posterior to the apex of the frog. The shoe of FIG. 6 and the shoe of FIG. 7 are designed so that the ends of the grab plate 70 lie on the front bearing points and dictate the location of the break over line FBL with respect to the foot. Thus, if a particular foot has been deformed through poor farrier practices or for some other reason, the application of the shoe of this invention will locate the shoe of this invention with respect to the center of the foot CL and not with respect to the toe of the foot. This will place the grab plate 70 of the foot within the region A shown in FIG. 1.

A horse's hind foot must articulate medially and laterally and it would likely be the case that a FIG. 7-type shoe would be employed rather that a FIG. 1-type shoe. However, it may be the case also that the FIG. 1-type shoe could be employed for a front foot.

FIGS. 1 through 7 illustrate the principles and details of the invention. Shoe 10 has toe portion 12, branches 14 and 16, and heel portions 18 and 20 at the ends of the branches. The shoe is provided with fullering grooves 22 and 24 as in conventional shoes and nail holes 26 and 28 with the fullering grooves 22 and 24.

Toe portion 12 of the FIGS. 2–6 shoe extends straight, as shown, across the front of the hoof so that the front edge 30 is recessed under the toe of the hoof (by as much as a quarter to as much as half an inch). The top surface 32 of the shoe which contacts the bottom of the hoof is essentially a flat planar surface. Front edge 30 angles rearwardly and downwardly to define front sloping surface 34 which extends across substantially the entire toe section of the shoe. Front surface 34 terminates as at lines 36 and 38 at its ends and along a line 40 at the lower edge of said slope. An inside sloped surface 42 angles downwardly and forwardly from rear toe edge 31. A lower edge 44 is spaced from edge 40. Between edges 40 and 44 is an insert or grab plate cavity 46 extending a predetermined depth up into the toe of the shoe. Preferably the angle of inside sloping surface 42 is about 50 to 53 degrees as indicated by the drawings though such angle may vary between about 45 to 55 degrees. The angle of 50 to 53 degrees will be recognized to represent the hoof angle in the average horse. The angle of inside surface 42 of the toe portion is included because it conforms to the angle of the coffin bone and because the grab plate tends to maintain its traction through a greater degree of hoof rotation.

Figure 3:
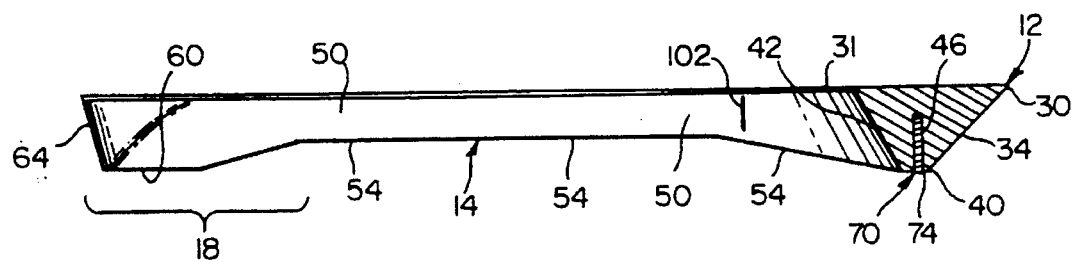
FIG. 3 is a partial cross section view taken along the line 3—3 of FIG. 2 showing the shape of the toe section.

The branches 14 and 16 of the shoe have sloping inside surfaces 50 and 52 which coincide with toe inside surface 42 and extend rearwardly to the heel portions 18 and 20. Ridge edges 54 and 56 extend from the grab plate cavity to the heel area and as can be seen in FIG. 3 the ridge edges are higher through the quarter part of the branches than near the toe or heel portions. Again, as pointed out in the general discussion of natural hoof wear, the hoof through the quarter part tends to be slightly upwardly rounded or concave. Thus, the ridge edges are shaped to reflect this natural wear pattern. At the heel portion of each branch the heel has rearwardly and downwardly extending contact surfaces 60 and 62 which raise the heel portions 18 and 20. The extreme rear of each heel has rear edge 64 or 66. It will be appreciated that the fullering grooves 22 and 24 are recessed with respect to the ridge edges 54 and 56 as is best illustrated in FIG. 4. The body of shoe 10 is preferably made of aluminum, but could be made of plastic or other metal as desired such as titanium, steel, etc.

The insert or grab plate, generally designated by the number 70, is a steel or other hard, well-wearing material shaped as shown. The shoe body can, if desired, be made integrally with the grab plate so that a separate insert is not necessary. The insert is basically rectangular to be received in cavity 46 of the toe of the shoe except for the outer edge which contacts or grips the ground. Thus, it is provided with an outer edge 74 which is shaped to coincide with the line 40 at the lower edge of sloping surface 34 of the shoe toe, and ends 78 and 80. Note that the ends of the grab plate are bent at an angle to the rear to conform to the curvature of the shoe body itself. Thus, the cavity 46 as well as the ends of the grab plate are shaped accordingly. The outer edge 74 may extend substantially above the lower edge line 40, depending upon the use to which the shoe is to be put. The insert grab plate shown is a racing style, part of which is slightly higher than the heel of the shoe. For saddle and other types of horses the grab plate and heel will be approximately the same height.

This toe insert, or grab plate, is of a much harder material from that from which the shoe is made. This grab plate is embedded into the shoe at the time of the forging. If necessary or desired, the grab plate may be slightly tapered outwardly, or otherwise so formed, as it extends into the shoe. Thus, when the shoe is forged the shoe metal will be filled around the grab plate and fixedly secure the grab plate in place.

In accordance with the principles of this invention, the shoe is mounted to a horse's foot such that the grab plate 70 is located within a zone forward of the tip T of the coffin bone. This zone is defined by the angle A which is between a first line extending vertically downward from the tip T of the coffin bone and a second line extending downward and forward from the tip T of the coffin bone to bound angle A. This angle A is 30°. The shoe would not be mounted such that the straight edge 74 of grab plate 70 would be located beyond 30°, nor directly under the tip T of the coffin bone. As a guide to positioning the shoe to conform with these principles, the shoe would be located such that the straight edge 74 of grab plate 70 would be located between about 1 and 1½ inches forwardly of the tip TF of the frog F; identified as distance D in FIGS. 1 and 7. Horseshoes are categorized by shoe sizes; #4 being the smallest and #8 being the largest for saddle horses. The preferred range for setting a horseshoe with respect to the frog tip TF in relation to shoe size is shown in the following Table.

TABLE

| Shoe Size | Shoe Length | Shoe Width | Distance (D) from TF |
|---|---|---|---|
| #4 | 4¼" | 4½" | 1" |
| 5 | 4½" | 4¾" | 1⅛" |
| 6 | 4¾" | 5" | 1¼" |
| 7 | 5" | 5¼" | 1⅜" |
| 8 | 5¼" | 5½" | 1½" |

As shown in FIG. 7, the inside surfaces 42, 50, 52 of the shoe toe and branches may be provided with positioning marks; such as line 100 for centering the shoe with respect to the frog tip TF, and lines 102,104 for forwardly-positioning the shoe with respect to the frog tip TF. These lines, actually positioning marks, can be forged into the shoe and appear as narrow ribs slightly raised beyond the shoe's inside surfaces or as narrow grooves slightly depressed into the shoe's inside surface. Each shoe size would be marked according to its size so as to insure placement of the shoe's grab plate 70 in accordance with the Table.

The straight outer edge 74 or the grab plate 70 becomes the breakover point for the horse's foot. If that breakover point is located with respect to the coffin bone tip T in accordance with the principles of this invention as related in the Table, the action of the foot during breakover will more closely replicate the natural foot breakover as experienced by a wild horse. The domestic horse's foot, under the influence of the shoe of this invention, will gradually reform itself more toward the natural foot structure evidenced by wild horses. The use of the shoe of this invention, therefore, has a therapeutic effect in aiding the domestic horse's foot to restructure itself more closely to the natural ideal. As the domestic horse's foot restructures itself, there will come a time when the shoe, as it is periodically reset, may be positioned with the grab plate 70 located nearer the coffin bone tip T. Therefore, the Table identifies distances D that are approximately the maximum for each given shoe size.

The FIG. 7 shoe is identical with the FIGS. 2–6 shoe excepting that the toe of the shoe is rounded and the grab plate is rounded as shown. All other relationships are as described with respect to FIGS. 2–6. The mid-point of the grab plate 70 of the FIG. 7 shoe must be higher than the elevation of the front bearing points FBP, FBP to insure that these points accurately and actually define the breakover line FBL for the shod foot. The distance D between the tip of the frog TF and the breakover line FBL is the same and the same considerations apply as discussed with respect to the FIGS. 2–6 shoe. In the FIG. 7 shoe, the front bearing points are located at the points where the radius of the shoe changes from the curvature of the flattened curve toe to the curvature of the branches.

We claim:

1. Horseshoe device for attachment to a horse's hoof, comprising:

(a) a generally U-shaped body made of substantially solid material and having a toe portion and a pair of arcuate branch portions with heel areas at the ends thereof, said toe portion transitioning into branch portions at the forward end of said body, said body having a top, substantially planar side for contacting a horse's hoof and including fullering grooves within said branch portions and nail holes therein for attaching said body to said hoof, (b) said toe portion being extended between said branch portions to provide a front edge sloped rearwardly and downwardly that extends across said toe portion and transitions into outer side edge surfaces of said branch portions and further having an inside edge sloped forwardly and downwardly that extends across said toe portion and transitions into inner side edge surfaces of said branch portions, the toe portion front and inside edges defining a lower bottom edge between them that extends across said toe portion, said lower bottom edge of said toe portion having a relatively narrow width extended across said toe portion and having enlarged front bearing areas at the ends thereof in the regions where said toe portion transitions into said branch portions, said enlarged front bearing areas of said lower bottom edge of said toe portion having the lowest elevation of said toe portion and including front bearing points for the body whereby said front bearing points define a front bearing line for said body extending across said toe portion with said fullering grooves located rearwardly of said front bearing points.

2. Horseshoe device for attachment to a horse's hoof according to claim 1 wherein, (c) said fullering grooves are so constructed and arranged that their forwardmost ends terminate within their respective branch portions sufficiently rearwardly of said front bearing points whereby generally flat front bearing areas are provided for said body that are located on said toe portion lower bottom edge forwardly of the forward ends of said fullering grooves.

3. Horseshoe device for attachment to a horse's hoof according to claim 1 wherein, (c) said toe portion has a bottom side which includes ground engaging grab plate means with a ground contact surface thereon so that said toe portion is of a predetermined thickness, said grab plate means terminating at its ends adjacent the loci of the transition of said inner edge of toe portion into said inner side edge surfaces of said branch portions, said grab plate means and said fullering grooves being so constructed and arranged so as to not overlap one another.

4. Horseshoe device for attachment to a horse's hoof according to claim 1 wherein, (c) said toe portion has a bottom side which includes ground engaging grab plate means with a ground contact surface thereon so that said toe portion is of a predetermined thickness, said ground contact surface being extended generally coincident with said front bearing line, said grab plate means terminating at its ends adjacent the loci of the transition of said inner edge of toe portion into said inner side edge surfaces of said branch portions with each end of said grab plate means defining an inner edge of one of said front bearing areas, said grab plate means and said fullering grooves being so constructed and arranged so as to not overlap one another.

5. Horseshoe device for attachment to a horse's hoof according to claim 1 wherein, (c) said fullering grooves are so constructed and arranged that their forwardmost ends terminate within their respective branch portions sufficiently rearwardly of said front bearing points whereby generally flat front bearing areas are provided for said body that are located on said toe portion lower bottom edge forwardly of the forward ends of said fullering grooves, (d) said toe portion has a bottom side which includes ground engaging grab plate means with a ground contact surface thereon so that said toe portion is of a predetermined thickness, said ground contact surface being extended generally coincident with said front bearing line, said grab plate means terminating at its ends adjacent the loci of the transition of said inner edge of toe portion into said inner side edge surfaces of said branch portions with each end of said grab plate means defining an inner edge of one of said front bearing areas, said grab plate means and said fullering grooves being so constructed and arranged so as to not overlap one another.

6. A method of applying a shoe having a structure as defined by claim 5 comprising the steps of providing such a shoe and fitting the shoe to a horse's hoof; locating the shoe with respect to the tip of the frog of the horse's hoof such that said grab plate means is located between about 1 and 1.5 inches forwardly of the frog tip; and securing the shoe to the horse's hoof wall.

7. Horseshoe device for attachment to a horse's hoof according to claim 1 wherein, (c) said fullering grooves are so constructed and arranged that their forwardmost ends terminate within their respective branch portions sufficiently rearwardly of said front bearing points whereby generally flat front bearing areas are provided for said body that are located on said toe portion lower bottom edge forwardly of the forward ends of said fullering grooves, (d) said toe port&on has a bottom side which includes ground engaging grab plate means with a ground contact surface thereon so that said toe portion is of a predetermined thickness, said ground contact surface being extended generally coincident with said front bearing line, said grab plate means terminating at its ends adjacent the loci of the transition of said inner edge of toe portion into said inner side edge surfaces of said branch portions with each end of said grab plate means defining an inner edge of one of said front bearing areas, said grab plate means and said fullering grooves being so constructed and arranged so as to not overlap one another, (e) said body includes ridge edges extending rearwardly from the ends of said grab plate means, said ridge edges being thicker near said grab plate ends and angling upwardly to define a higher and thinner ridge edge through the quarter portion of said shoe body, and (f) said ground contact surface of said grab plate means and said ridge edges being located interiorly of the nail pattern of said fullering grooves such that stress on said hoof is shifted interiorly of the horn portion thereof.

8. Horseshoe device for attachment to a horse's hoof according to claim 7 wherein, (g) said toe portion is generally linearly straight across between said branch portions so as to extend under and be spaced rearwardly of the toe of said horse's hoof a predetermined distance, said toe portion having front and rear edges extending from near said top side of said body.

9. Horseshoe device for attachment to a horse's hoof according to claim i wherein, (c) said fullering grooves are so constructed and arranged that their forwardmost ends terminate within their respective branch portions sufficiently rearwardly of said front bearing points whereby generally flat front bearing areas are provided for said body that are located on said toe portion lower bottom edge forwardly of the forward ends of said fullering grooves, (d) said toe portion is shaped generally slightly rounded and flattened across between said branch portions so as to extend under and be spaced rearwardly of the toe of said horse's hoof a predetermined distance, said toe portion having front and rear edges extending from near said top side of said body, (e) said toe portion having a bottom side which includes ground engaging grab plate means with a ground contact surface thereon so that said toe portion is of a predetermined thickness, said ground contact surface being slightly curved (f) said grab plate means having end sections thereof which angle rearwardly, said body including ridge edges extending rearwardly from the ends of said grab plate end sections, said ridge edges being thicker near said grab plate end sections and angling upwardly to define a higher and thinner ridge edge through the quarter portion of said shoe body, and (g) said ground contact surface of said grab plate means and said ridge edges being located interiorly of the nail pattern of said fullering grooves such that stress on said hoof is shifted interiorly of the horn portion thereof.

10. A method of applying a shoe having a structure as defined by claim 9 comprising the steps of providing such a shoe and fitting the shoe to a horse's hoof; locating the shoe with respect to the tip of the frog of the horse's hoof such that said grab plate means is located between about 1 and 1.5 inches forwardly of the frog tip; and securing the shoe to the horse's hoof wall.

11. A method of applying a shoe having a structure as defined by claim 1 comprising the steps of providing such a shoe and fitting the shoe to a horse's hoof; locating the shoe with respect to the tip of the frog of the horse's hoof such that said lower bottom edge of said toe portion is located between about 1 and 1.5 inches forwardly of the frog tip; and securing the shoe to the horse's hoof wall.

* * * * *